Aug. 26, 1952 — E. H. NELSON — 2,607,981

QUARTZ TO METAL SEAL

Filed Aug. 6, 1948

Inventor:
Evan Herbert Nelson,
by Vernet C. Kauffman
His Attorney

Patented Aug. 26, 1952

2,607,981

UNITED STATES PATENT OFFICE 2,607,981

QUARTZ TO METAL SEAL

Evan Herbert Nelson, Middlesex, England, assignor to General Electric Company, a corporation of New York Application August 6, 1948, Serial No. 42,823
In Great Britain August 8, 1947

1 Claim. (Cl. 29—188)

This invention relates to seal bodies of the type wherein a conductor is hermetically sealed through a wall of vitreous material of low thermal expansion coefficient, such as quartz. The invention also relates to electric discharge devices, and especially high pressure gas-filled or vapor-filled discharge lamps having envelopes of low expansion vitreous material incorporating such seal bodies.

In seal bodies of the type specified, it is often desirable that the conductor should be a stout body of tungsten, for example a stout rod, but the difficulty arises that such bodies often cannot be sealed directly to the vitreous material owing to the difference in thermal expansion which would result in cracking of the seal on heating. In one method that has been proposed for overcoming this difficulty, two collinear tungsten rods are welded to, or abut under pressure against, opposite sides of a thin molybdenum sheet whose edges are hermetically embedded in the vitreous material. It has hitherto been difficult to unite the thin molybdenum sheet satisfactorily with the tugnsten conductor for it is difficult to weld the molybdenum to the tungsten. It has been proposed to use nickel sandwiched between the molybdenum sheet and the tungsten for overcoming this difficulty in welding.

The principal object of my invention is to provide improved seal bodies and improved methods for their fabrication.

Figure 1:
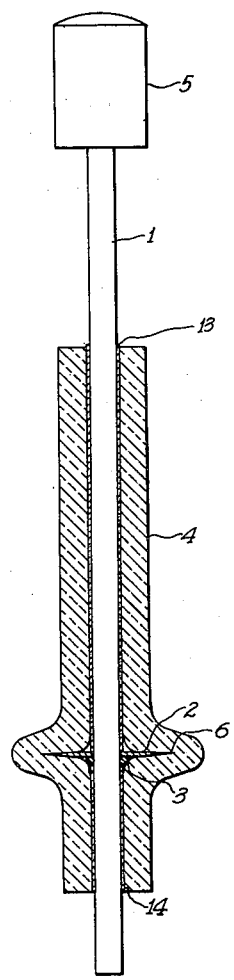
Figure 2:
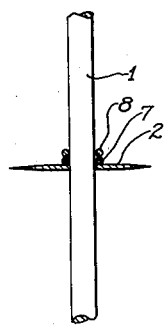
Figure 3:
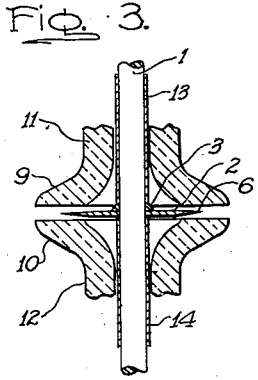
Figure 4:
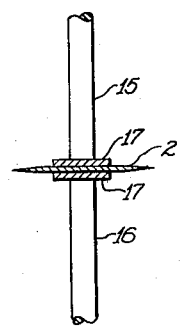

Further objects and advantages of the invention will appear from the following detailed description of species thereof and from the accompanying drawings in which Fig. 1 is an elevation, partly sectional, view of a seal body in the form of a stem for an electric discharge quartz lamp; Fig. 2 is a fragmentary view of the metal parts of the seal body assembled for being joined together; Fig. 3 is a similar view of the metal parts and the vitreous parts of the seal body assembled for joining together to form the stem, and Fig. 4 is a similar view of the metal parts of a similar seal body.

Referring to Figs. 1 to 3 of the drawing, the lamp stem comprises a stout tungsten conductor rod 1 which passes through an aperture in a thin molybdenum sheet in the form of a disc 2 which is hermetically joined to and around the tungsten conductor by the use of a solder or brazing medium of metal, shown at 3, which unites both with molybdenum and with tungsten on heating. Part of the molybdenum disc 2 is embedded in the vitreous material which is in the form of a tube 4 which supports the metal parts of the stem. An electrode 5 of tungsten is mounted on the inner end of rod 1.

As shown, the edge 6 of the molybdenum disc 2 is tapered to form a sealing edge and is embedded in the tube 4 of vitreous material. The embedded part of disc 2 extends all the way around the rod 1 in order to complete the hermetic seal.

One metal which unites both with molybdenum and tugnsten is nickel, but while this metal may in some cases be used satisfactorily as a solder or brazing medium, I have found that it often attacks the thin molybdenum disc 2 so as to leave gaps between the disc and the tungsten conductor rod 1. Accordingly, I prefer to use a molybdenum-rich alloy of nickel and molybdenum as the solder or brazing medium. Such an alloy may readily be produced in situ in performing the soldering or brazing operation.

Thus, in one method of forming the seal body, described by way of example, the tungsten rod 1 is passed through a central aperture in the thin molybdenum disc 2, the rod fitting the aperture closely as shown in Fig. 2. A ring 7 of thin molybdenum wire fitting closely around the tungsten rod is then placed around the rod 1 in the corner between the rod 1 and the upper surface of the molybdenum disc 2 and a similar ring 8 of nickel wire is placed next to the ring of molybdenum wire.

The rod 1 is held vertically with the wire rings 7 and 8 above the molybdenum disc 2, as shown, and the rings are heated, for example in an electric oven in a reducing atmosphere, until the nickel ring 8 melts and flows down over the molybdenum ring 7 to form a molybdenum-rich alloy which solders or brazes the molybdenum disc 2 to the tungsten rod 1 on cooling, as shown at 3 in Figs. 1 and 3. To avoid oxidation, the heating is carried out in an electric oven in a reducing atmosphere such as forming gas, which is a mixture of hydrogen and nitrogen. The seal body, after being formed, is allowed to cool in a similar atmosphere until below the oxidizing temperature of any of its parts.

The seal body is then joined to the vitreous part of the lamp stem in the manner shown in Fig. 3 and similar to that described in British Patent 563,027, that is, the disc 2 is mounted between the flanges 9 and 10 of two quartz tubes 11 and 12 which extend beyond the ends of the rod 1. The outer edges of the flanges are then fused together without the edge 6 of disc 2 being embedded in them. In order to avoid oxidation of the disc during joining of the flanges, nitrogen is passed through the outer ends of tubes 11 and 12 until the edges of the flanges 9 and 10 are joined. The space enclosed by the joined tubes 11 and 12 is then evacuated and the flanges 9 and 10 are heated so that they collapse onto and fuse with the disc 2, being pressed thereon by atmospheric pressure. The parts of tubes 11 and 12 near the disc 2 are then collapsed onto the thin molybdenum foil sheets 13 and 14 wrapped around the rod 1 before assembling the seal body in the tubes 11 and 12 to prevent the quartz from fusing with rod 1. The excess tubing is then removed so as to expose the ends of the rod 1 and the electrode 5 is then mounted on the end of rod 1. The completed stem may be mounted on a quartz envelope by means of a quartz ring fused to the end portion of tube 4 nearest the electrode 5.

The species of the invention shown in Fig. 4 is similar to that shown in Figs. 1 to 3 except that the tungsten conductor rod does not pass through the molybdenum disc 2 but is in two parts 15 and 16 united to opposite sides of the disc 2 so that they effectively form prolongations of each other. In making such a seal body, the rods and the disc are assembled with a thin piece 17 of a molybdenum-rich alloy of nickel and molybdenum sandwiched between the end of each rod and the face of the disc against which it abuts. The size of pieces 17 has been exaggerated in the drawing. The assembly is then placed for five minutes in an electric oven maintained at 1600° and filled with a reducing atmosphere, such as forming gas. The brazed joints between the disc 2 and the ends of rods 15 and 16 are then found to be formed on cooling of the assembly. The seal body may then be joined to the vitreous part of the stem in the same manner described in conjunction with Figs. 1 to 3.

Copper is a possible alternative metal to nickel for use as the brazing medium, though copper should not be used if the brazed joint is exposed to attack by mercury in use of the seal body as it would be if exposed on the inside of a high pressure mercury vapor discharge lamp. However, copper may be used for the brazed joint between disc 2 and whichever rod 15 or 16 extends to the outside of the lamp stem.

By brazing is meant, for the purposes of this invention, the joining of two metals by heating them in juxtaposition with a third metal, which may be an alloy, of lower melting point, which unites with both and may or may not melt during the heating. The terms "solder" and "brazing medium" are often use synonymously and both terms are used in this specification in order to make it clear that no limitations are implied on the composition of suitable metals for joining the conductor and the disc and that the metal may or may not melt during heating.

A molybdenum-rich alloy of nickel and molybdenum may, in many cases, be formed in situ during the brazing operation by heating molybdenum in contact with nickel; in some cases the heating may be below the melting point of the nickel, or in others it may be arranged, as in the species of Figs. 1 to 3, that molten nickel flows over moylbdenum provided for the purpose before reaching the junction of the tungsten and molybdenum members of the seal body.

The pieces 17 of molybdenum-rich alloy of nickel and molybdenum sandwiched between disc 2 and the ends of rods 15 and 16 in Fig. 4 are formed preferably before the members of the seal body are assembled.

Molybdenum rods may be used in place of rods 1, 15, and 16.

What I claim as new and desire to secure by Letters Patent of the United States is:

The method of hermetically uniting a thin molybdenum sealing disc for a quartz-to-metal seal body around a conductor rod of metal of the group consisting of tungsten and molybdenum which comprises the steps of providing the disc with an aperture to receive and closely fit the rod, placing the disc on the rod with the latter extending through the aperture, positioning a molybdenum ring around the rod and immediately over the juncture between the disc and the rod, positioning over the molybdenum ring a second ring of metal of the group consisting of nickel and copper and then sealing said juncture by heating the assembly while in a non-oxidizing atmosphere until the metal of the second ring becomes molten and flows over the molybdenum ring to form a molybdenum rich alloy which flows into and seals said juncture.

EVAN HERBERT NELSON.

REFERENCES CITED

The following references are of record in the file of this patent:

UNITED STATES PATENTS

| Number | Name | Date |
| --- | --- | --- |
| 1,271,245 | Von Recklinghausen | July 2, 1918 |
| 1,293,441 | Houskeeper | Feb. 4, 1919 |
| 1,733,744 | Marden et al. | Oct. 29, 1929 |
| 2,005,256 | Eitel | June 18, 1935 |
| 2,159,806 | Lenz et al. | May 23, 1939 |
| 2,163,409 | Pulfrich | June 20, 1939 |
| 2,207,380 | Kurtz | July 9, 1940 |
| 2,220,961 | Kern | Nov. 12, 1940 |
| 2,387,903 | Hensel | Oct. 30, 1945 |
| 2,431,368 | Cherry | Nov. 25, 1947 |
| 2,464,591 | Larsen | Mar. 15, 1949 |

FOREIGN PATENTS

| Number | Country | Date |
| --- | --- | --- |
| 563,027 | Great Britain | July 26, 1944 |

OTHER REFERENCES

Aufbauder Zewiestofflegierungen by M. Hansen, Publ. by Edward Bros., Inc., Ann Arbor, Mich. (Copy in Pat. Off. Scientific Library.)